US006022482A

United States Patent [19]

Chen et al.

[11] Patent Number: 6,022,482

[45] Date of Patent: Feb. 8, 2000

[54] MONOLITHIC INK JET PRINTHEAD

[75] Inventors: Jingkuang Chen, Ann Arbor, Mich.; Biay-Cheng Hseih, Pittsford, N.Y.

[73] Assignee: Xerox Corporation, Stamford, Conn.

[21] Appl. No.: 08/905,759

[22] Filed: Aug. 4, 1997

[51] Int. Cl.[7] .......................... G01D 15/00; B11B 05/27

[52] U.S. Cl. .......................................... 216/27; 347/65

[58] Field of Search ............................ 216/27; 347/65

[56] References Cited

U.S. PATENT DOCUMENTS

| | | | |
|---|---|---|---|
| Re. 32,572 | 1/1988 | Hawkins et al. | 156/626 |
| 4,438,191 | 3/1984 | Cloutier et al. | 430/324 |
| 4,568,953 | 2/1986 | Aoki et al. | 346/140 R |
| 4,947,192 | 8/1990 | Hawkins et al. | 346/140 R |
| 5,211,806 | 5/1993 | Wong et al. | 156/644 |

OTHER PUBLICATIONS

P.F. Man, D. K. Jones, and C. H. Mastrangelo, "Microfluidic Plastic Capillaries on Silicon Substrates: A New Inexpensive Technology for Bioanalysis Chips", Center for Integrated Sensors and Circuits, Department of Electrical Engineering and Computer Science, University of Michigan, Ann Arbor, MI 48109–2212, USA, published on Jan. 26, 1997, in the Proceedings of IEEE 10th Annual International Workshop on Micro Elecro Mechanical Systems, on pp. 311–316.

*Primary Examiner*—John Barlow
*Assistant Examiner*—H. Mahoney

[57] ABSTRACT

A method and structure are described for a monolithic roofshooter ink jet printhead which has nozzles and ink channels formed in a polyimide layer overlying a silicon substrate. Resistor heaters, addressing logic circuitry, and ink inlets are formed in a silicon substrate. A fabrication process, simple and monolithic, is performed at low temperatures resulting in a structure which has nozzle diameters of 30 $\mu$ separated by distances of 10 $\mu$ or less. This structure results in a printhead which has a printing resolution of 630 dpi.

3 Claims, 5 Drawing Sheets

MONOLITHIC INK JET PRINTHEAD

This invention relates to ink jet printheads and, more particularly, to a monolithic ink jet printhead comprising a polyimide manifold overlying a silicon substrate.

Ink jet printers have come to dominate the lower end printing market due to its low cost (relative to laser printers), reduced noise and simpler printing apparatus. Furthermore, the print quality including color prints of ink jet printers has been approaching that of the laser printers.

Further improvements in ink jet print quality depend upon a reliable, high yield process for fabricating ink jet printheads with increased numbers of nozzles to obtain higher resolution.

Ink jet printers, or plotters, of the so-called "drop-on-demand" type have at least one printhead from which droplets of ink are directed towards a recording medium. Within the printhead, the ink is contained in a plurality of channels and energy pulses are applied to transducers to cause the droplets of ink to be expelled, as required, from nozzles at the ends of the channels.

There are two general configurations for thermal drop-on-demand ink jet printheads. In one configuration, droplets are propelled from nozzles formed in the printhead front face in a direction parallel to the flow of ink in ink channels and parallel to the surface of the bubble-generating heating elements of the printhead, such as, for example, the printhead configuration disclosed in U.S. Pat. Re. No. 32,572. This configuration is sometimes referred to as an edge shooter or a side shooter. The other thermal ink jet configuration propels droplets from nozzles in a direction normal to the surface of the bubble-generating heating elements, such as, for example, the printhead disclosed in U.S. Pat. No. 4,568,953. This configuration is sometimes referred to as a roofshooter. A defining difference between the two configurations lies in the direction of droplet ejection, in that the side shooter configuration ejects droplets in the plane of the substrate having the heating elements, whereas the roofshooter ejects droplets out of the plane of the substrate having the heating elements and in a direction normal thereto.

Sideshooter printheads of the type disclosed in U.S. Pat. Re. No. 32,572 are fabricated by bonding together two silicon substrates, a silicon heater wafer and a silicon Orientation Dependent Etched (ODE) channel wafer, to form sealed microchannels. An individual printhead chip is then released by a dicing process, which also expose the nozzles. The major disadvantages of this approach are tedious assembly processes, difficult yield control of epoxy bonding and dicing processes, and problems associated with ink ejection efficiency and uniformity due to the triangular, or trapezoidal, nozzles formed by anisotropic ODE in silicon.

A roofshooter printhead of the type disclosed in U.S. Pat. No. 4,568,953 is a hybrid design which uses an electroplating technique to form a nickel nozzle array on the surface of a silicon substrate containing ink channels, resistors and electrical connections. This nozzle plate design limits achieving the high density of nozzles required to reach laser like print quality. Substrate fabrication techniques are also subject to low yields.

In order to overcome the above-noted disadvantages of prior art printhead construction, it would be desirable to increase the yield and increase the number of nozzles used to form the printhead.

SUMMARY OF THE INVENTION

According to the invention, these, and other beneficial features, are realized by using a highly miniaturized and integrated silicon micromachining technique for fabricating a monolithic roofshooter type printhead. No substrate bonding is required offering yield advantages. In order to increase the number of nozzles on a printhead while minimizing the number of electrical interconnect wires, direct integration of addressing circuitry on printhead is accomplished. The feasibility of integrating addressing circuitry on-chip enables implementing hundreds of nozzles on a printhead, which is critical to enhance the printing speed.

The substrate for this printhead is a (100) silicon wafer, which supports the nozzle controlling circuitry, the heaters for ink actuation, the bonding pads for electrical interconnect, and provides via holes for ink supply. On top of the silicon substrate, a polyimide manifold which includes nozzles, ink cavity, and part of the front-end ink reservoir is integrated using standard photolithographic steps and a sacrificial etch. The advantage of this printhead structure is that the fabrication process is simple and fully monolithic, resulting in higher yield and lower cost. Also, the circular nozzle in this design with a roofshooting arrangement enhances the ejection efficiency and minimizes the satellite drop effect. The fabrication process of this printhead can be separated into two major steps: The first step is the integration of CMOS circuits and heaters on a silicon substrate, while the second step is the molding of the polyimide manifold and a bulk etch to open a hole for ink supply.

A prior art approach to a monolithic roofshooter printhead design is disclosed in U.S. Pat. No. 5,211,806. According to this method, a metal mandrel models ink channels and an ink manifold on the substrate surface and a nozzle cap is attached to this mandrel. This design is subject to the same limitation as the design of '953, supra; e.g., limitations of a nozzle density.

Another prior art technique disclosed in a paper by P. F. Man, D. K. Jones, and C. H. Mastrangelo, "Microfluidic Plastic Capillaries on Silicon Substrates: A New Inexpensive Technology for Bioanalysis Chips", Center for Integrated Sensors and Circuits, Department of Electrical Engineering and Computer Science, University of Michigan, Ann Arbor, Mich. 48109-2212, USA, published on Jan. 26, 1997, in the Proceedings of IEEE 10th Annual International Workshop on Micro Elecro Mechanical Systems, on pgs. 311–316, discloses a fabrication technology forming plastic capillaries in a planar substrate. The device constitutes miniaturized chemical analysis systems and do not disclose fabrication of closely spaced, small mesa nozzle designs required for ink jet printheads.

Another monolithic sideshooter design is disclosed in U.S. Pat. No. 4,947,192. An ink jet printhead has integrated circuits formed by NMOS or CMOS technology. Both drive circuits and heater resistors are formed in the same silicon substrate.

A monolithic roofshooter design is disclosed in U.S. Pat. No. 4,438,191. This design fabricates a perimeter/wall around the resistors and then electroplates in place.

More particularly, the present invention relates to a monolithic roofshooter thermal ink jet printer comprising:

a silicon substrate having at least a resistive heater on one surface and resistive circuitry connected between at least said heater and an input signal source, a dielectric layer overlying the resistor and circuitry, a metal passivation layer overlying a portion of the dielectric layer overlying the heater resistor and a polyimide ink manifold overlying said dielectric layer, said polyimide manifold having formed therein at least one nozzle and an associated ink channel overlying said resistor heater, said substrate having an ink inlet orifice formed on a second surface and communicating with said ink channel.

The invention also relates to a method for constructing a monolithic thermal ink jet printhead, the printhead having a silicon substrate with a first, top, and a second, bottom, surface and a polyimide layer formed on said top surface, the polyimide layer defining ink nozzles and an ink manifold, the method comprising the steps of:

(a) providing a (100) silicon substrate, (b) cleaning said substrate, (c) forming a plurality of equally spaced linear arrays of resistive material on the top surface of the substrate for subsequent use as arrays of heating elements, (d) depositing a pattern of electrodes on said top surface to enable circuitry for individual addressing of each heating element with electrical pulses, (e) forming a passivating dielectric layer on at least said top surface, (f) forming a metal passivating layer on a portion of the dielectric layer overlying the heater resistors, (g) applying a photoresist over the dielectric layer formed on the top surface, (h) exposing said photoresist to define a plurality of mesas having a roof structure with roof corners, (i) depositing a metal film over the exposed portion of the dielectric layer and the mesas, the film overlying all of the primary portion of the primary surface of the printhead excepting "dead" areas underlying said roof corners, (j) coating a parylene layer on top of the aluminum film and said roof structure "dead" area, (k) removing said parylene layer excepting said parylene sealing said "dead" area, (l) forming a photosensitive polyimide layer over the top surface of the printhead including the aluminum film and the mesa, (m) patterning the polyimide layer to form a plurality of nozzles overlying said mesa, (n) removing the aluminum film under the nozzles by using an etching process, (o) dissolving the mesa using an acetone etch to form channels beneath the nozzles and (p) etching the bottom surface of the substrate to form an ink inlet orifice connecting into said channels.

DESCRIPTION OF THE INVENTION

Figure 1:
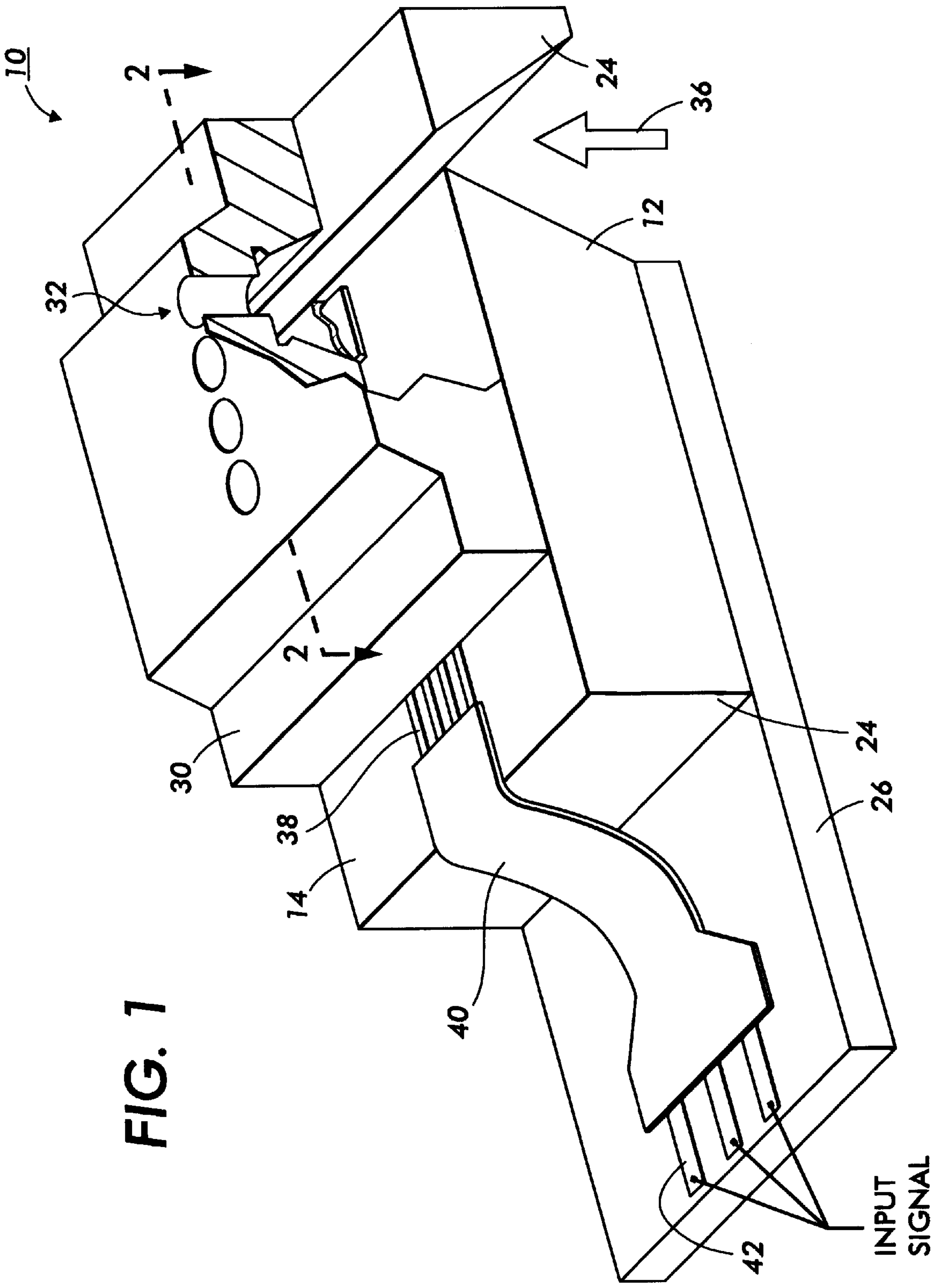
FIG. 1 is a top perspective view of the monolithic printhead of the present invention.
Figure 2:
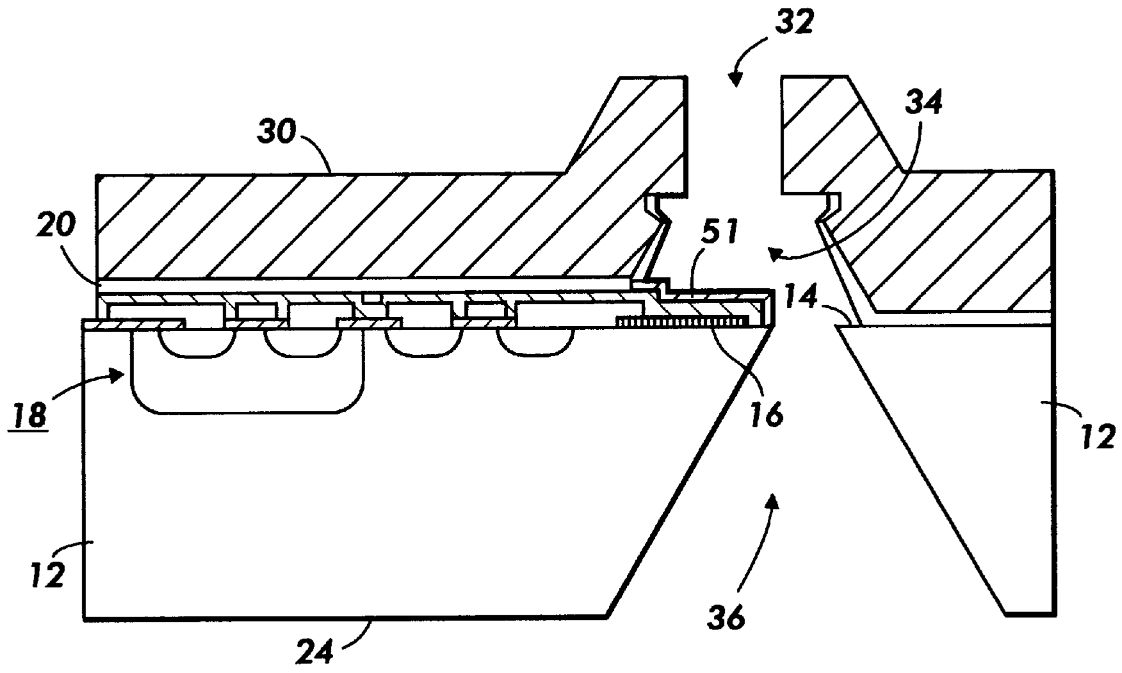
FIG. 2 is a cross-sectional view through 2—2 of FIG. 1.

Referring to FIGS. 1 and 2, there is shown a perspective and cross-sectional view, respectively, of a monolithic roof-shooter printhead 10 of the present invention. Printhead 10 is one of a plurality of printheads which can be simultaneously formed as substrates and later separated after process steps are complete. Printhead 10 includes a silicon substrate 12 having a top or primary surface 14 upon which are formed resistive heaters 16, drive logic circuitry 18 and addressing electrodes 20. A portion of the bottom or secondary surface 24 of substrate 12 is bonded to a printed circuit board 26. Formed by a process described below, a polyimide manifold 30 overlies the substrate surface 14. Manifold 30 includes a plurality of nozzles 32 and associated ink channels 34. An ink inlet orifice 36 connects with an ink reservoir (not shown) and provides ink flow into channels 34 and into nozzles 32. Heaters 16 are selectively supplied current pulses by a source not shown through electrodes 38 via a flexible silicon ribbon cable 40. The other end of cable 40 is supported on the surface of circuit board 26 upon which are formed leads 42. Leads 42 are connected to an input signal source such as a host computer. Input signals are then sent via the ribbon cable 26 to drive circuitry 18 to provide pulsing (heating) of heater 16.

Referring now to FIGS. 3–8, there are shown cross-sectional views of the printhead of FIGS. 1, 2. One nozzle is shown for ease of description; although, it is understood that a plurality of closely spaced nozzles can be fabricated by the method of the invention. The substrate 12 is first cleaned with acetone and IPA. The CMOS circuitry and heater 16 are then formed with conventional MOS circuitry. A CVD (Chemical Vapor Deposition) oxide layer 50 is formed on the top surface 14 of substrate 12 to passivate the CMOS circuitry 18 and the heater 16. On top of a portion of the oxide layer 50, a thin, metal passivation layer, tantalum film 51 in a preferred embodiment, is sputtered and patterned for protecting the heaters from ink bubble bombardment. A photoresist, such as AZ 4620, is then spun on the silicon wafer to form a 20$\mu$ thick layer. After soft baking, the photoresist is aligned, exposed, developed, and then rinsed to form approximately 20$\mu$ high mesas 52 which serve to define the ink cavities and reservoirs. These mesas are separated by approximately 4$\mu$ and will be sacrificially removed in the final step using a wet etch.

Figure 3:
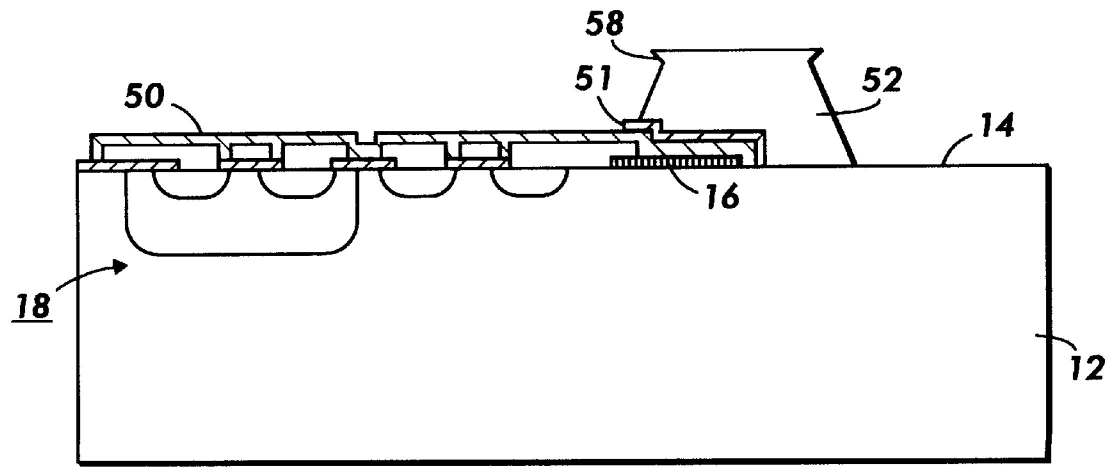
FIGS. 3–8 are cross-sectional views of the printhead during the fabrication process.
Figure 4:
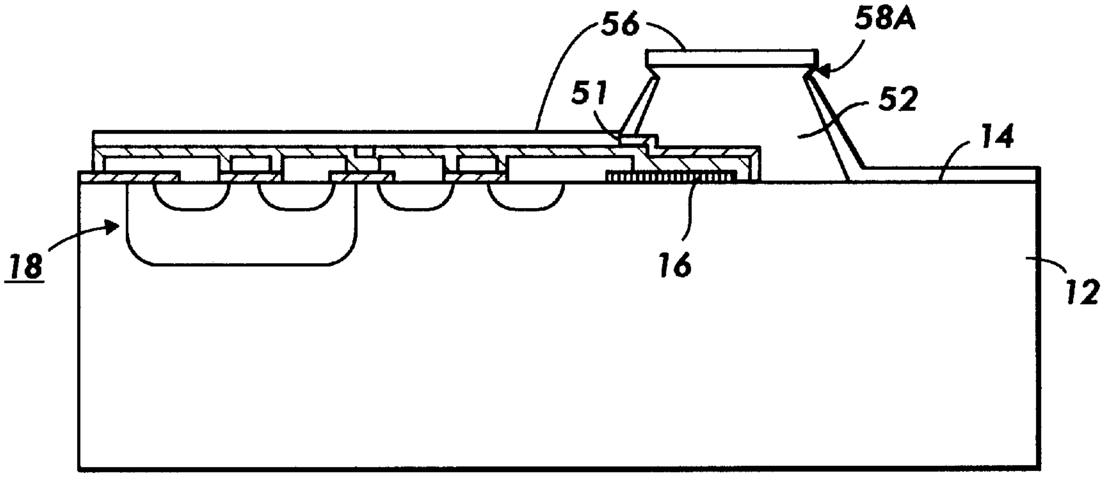
Figure 5:
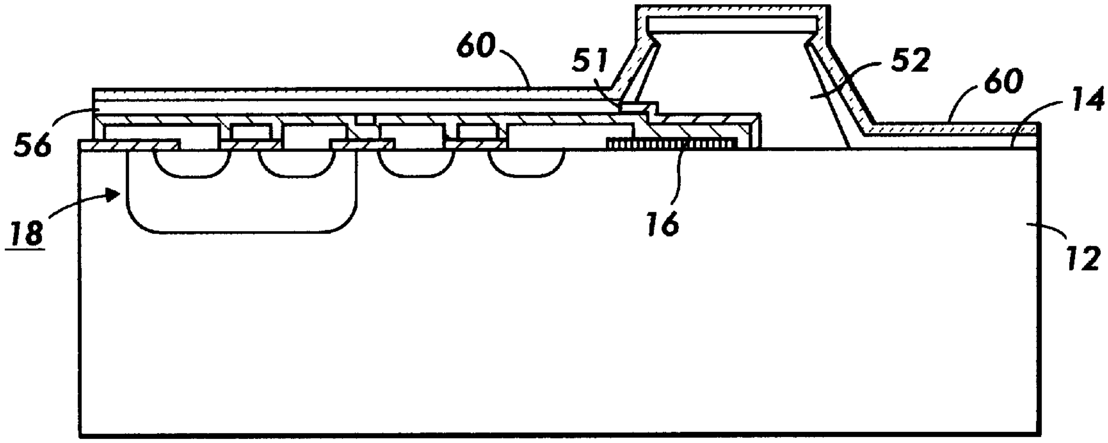
Figure 6:
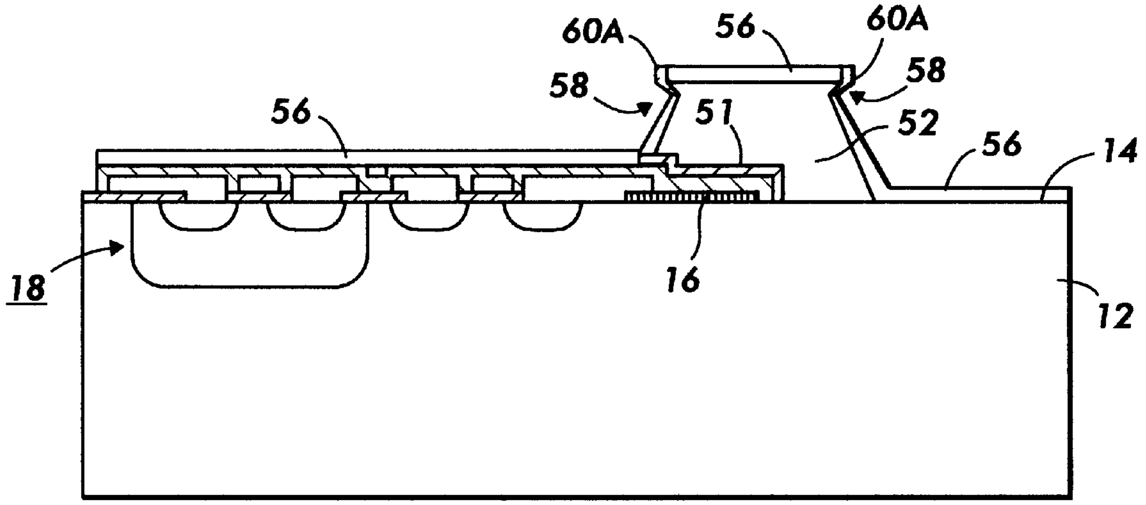

Referring now to FIG. 4, a 1000 Å thick aluminum film 56 is sputtered as an interfacial layer to prevent mixing of the polyimide layer 30 and the underlying photoresist. As shown in FIG. 3, there is a corner 58 on the upper part of mesa 52. The space under the roof corner is a "dead" angle which is difficult to sputter aluminum into. As a result, the aluminum film disconnects at the roof corners forming a gap 58A. In order to seal gap 58A, a parylene layer 60 is conformally coated on top of film 56, as shown in FIG. 5, thereby sealing corner 58 and gap 58A Since parylene will not provide good adhesion between the polyimide layer to be subsequently applied and the silicon substrate, layer 60 is next removed except for the small segments 60A located within the roof corners 58 (see FIG. 6). The parylene removal is preferably accomplished by an oxygen plasma unmasked dry etch process. Parylene segments 60A under the roof corner is shielded by the roof structure so that the segments are free from being attacked while the remainder of layer 60, being directly bombarded by the oxygen plasma, is totally removed.

Figure 7:
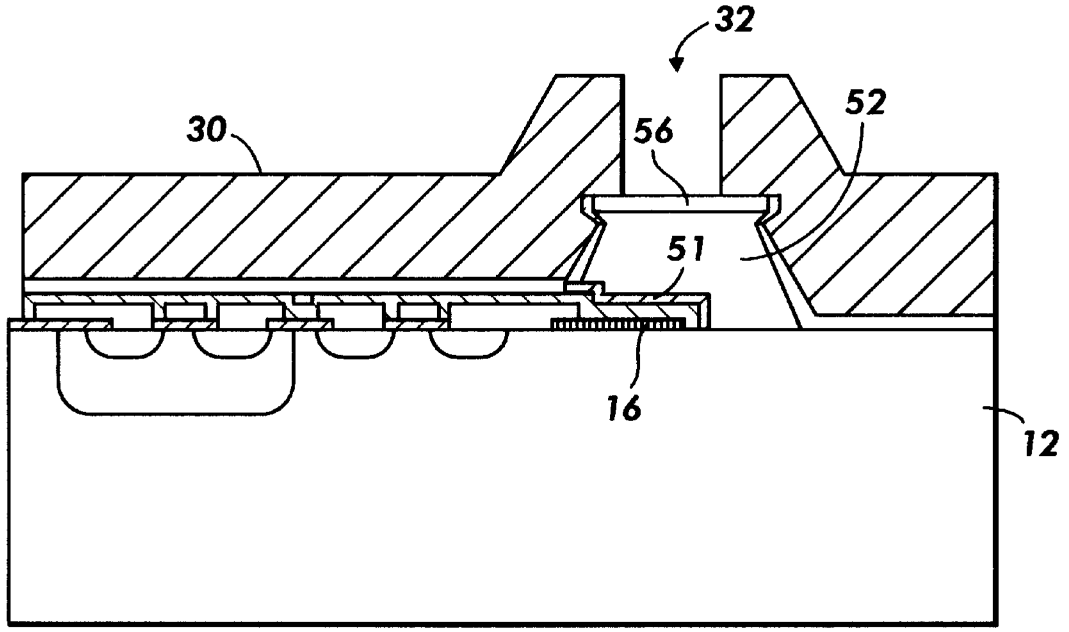
Figure 8:
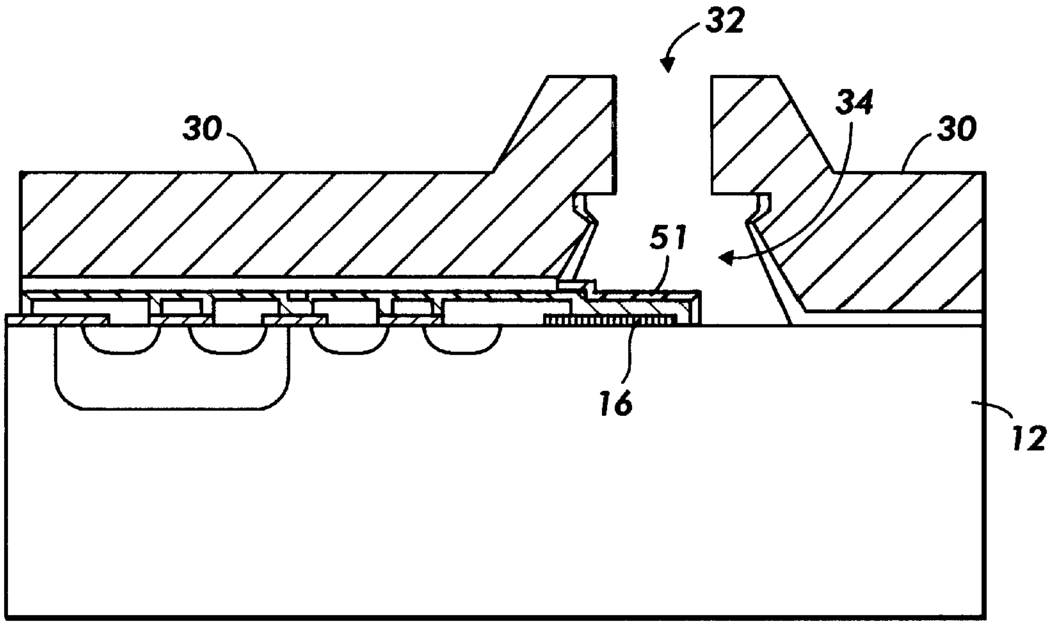

FIG. 7 shows formation of a 30$\mu$ thick photosensitive polyimide layer 30 which is spun onto the whole structure. The polyimide is then patterned using photolithographic steps to form nozzles 32. The thin aluminum film 56 under the nozzle is removed by using a wet or dry etch exposing mesas 52. The mesas are then dissolved using an acetone etch, forming an ink cavity 34 under nozzle 32 as shown in FIG. 8.

The ink inlet orifice 36, shown in FIG. 2, is etched using either KOH or EDP (ethylene diamine-pyrocatechol) from the bottom side of substrate 12 to form the complete printhead.

Figure 9:
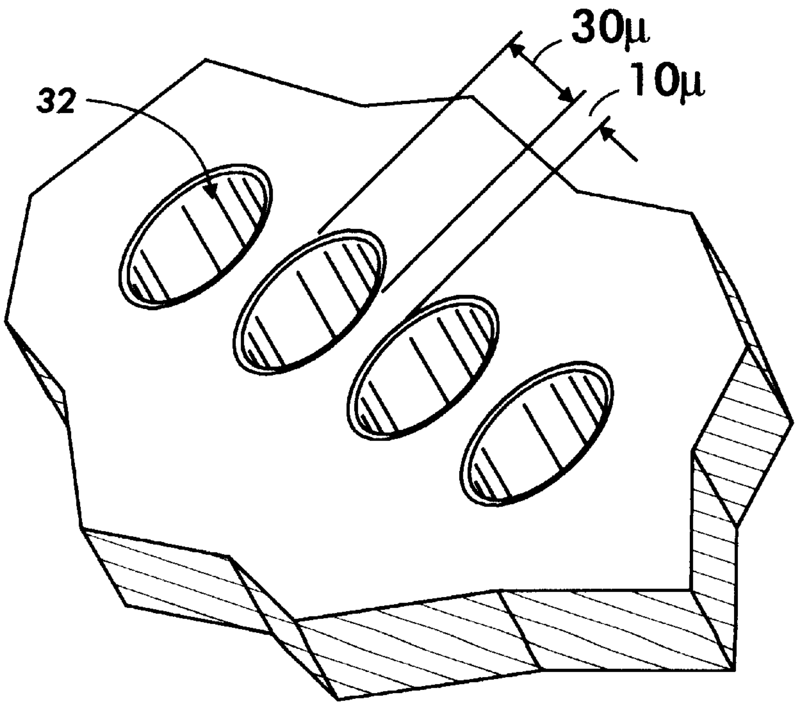
FIG. 9 is a line drawing representation of an SEM photograph of a nozzle array made by the process steps described in connection with FIGS. 3–8.

FIG. 9 is a rendering of an SEM photograph of an actual polyimide nozzle array fabricated by the above process. The diameter of each nozzle 32 is 30 $\mu$ while the separation between each nozzle is 10 $\mu$, resulting in a 630 dpi resolution of an image formed on the record medium by this printhead. The inter-nozzle separation can be as little as 5$\mu$ with this process.

While the embodiment disclosed herein is preferred, it will be appreciated from this teaching that various alternative, modifications, variations or improvements therein may be made by those skilled in the art, which are intended to be encompassed by the following claims:

What is claimed is:

1. A method for constructing a monolithic thermal ink jet printhead, the printhead having a silicon substrate with a first, top, and a second, bottom, surface and a polyimide layer formed on said top surface, the polyimide layer defining ink nozzles and an ink manifold, the method comprising the steps of:

(a) providing a (100) silicon substrate, (b) cleaning said substrate, (c) forming a plurality of equally spaced linear arrays of resistive material on the top surface of the substrate for subsequent use as arrays of heating elements, (d) depositing a pattern of electrodes on said top surface to enable circuitry for individual addressing of each heating element with electrical pulses, (e) forming a passivating dielectric layer on at least said top surface, (f) forming a metal passivating layer on a portion of the dielectric layer overlying the heater resistors, (g) applying a photoresist over the dielectric layer formed on the top surface, (h) exposing said photoresist to define a plurality of mesas having a roof structure with roof corners, (i) depositing a metal film over the exposed portion of the dielectric layer and the mesas, the film overlying all of the primary portion of the primary surface of the printhead excepting "dead" areas underlying said roof corners, (j) coating a parylene layer on top of the aluminum film and said roof structure "dead" area, (k) removing said parylene layer excepting said parylene sealing said "dead" area, (l) forming a photosensitive polyimide layer over the top surface of the printhead including the aluminum film and the mesa, (m) patterning the polyimide layer to form a plurality of nozzles overlying said mesa, (n) removing the aluminum film under the nozzles by using an etching process, (o) dissolving the mesa using an acetone etch to form channels beneath the nozzles and (p) etching the bottom surface of the substrate to form an ink inlet orifice connecting into said channels.

2. The method of claim 1 wherein said nozzles are separated by approximately 10$\mu$ or less.

3. The method of claim 1 wherein said metal deposited over the exposed portion of the dielectric layer and the mesas is aluminum.

* * * * *